Nov. 10, 1931.  J. B. HENDERSON  1,831,597
GYROSCOPIC APPARATUS
Filed Jan. 3, 1924   3 Sheets-Sheet 1

INVENTOR
JAMES BLACKLOCK HENDERSON
BY
*Henry Moseley*
ATTORNEY

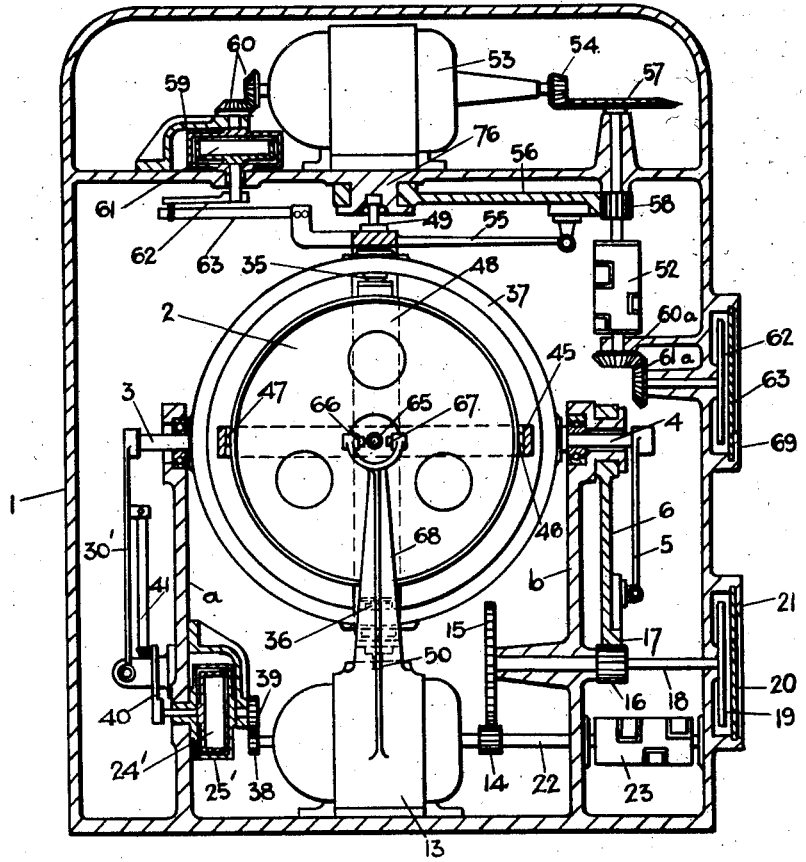

Nov. 10, 1931.  J. B. HENDERSON  1,831,597
GYROSCOPIC APPARATUS
Filed Jan. 3, 1924  3 Sheets-Sheet 3

INVENTOR
JAMES BLACKLOCK HENDERSON.
BY Henry Moakley
ATTORNEY

Patented Nov. 10, 1931

1,831,597

UNITED STATES PATENT OFFICE

JAMES BLACKLOCK HENDERSON, OF BLACKHEATH, ENGLAND

GYROSCOPIC APPARATUS

Application filed January 3, 1924, Serial No. 684,234, and in Great Britain January 3, 1923.

My invention relates to improvements in gyroscopic apparatus for indicating or measuring the angular velocity of bodies such as ships, aircraft and the like, the gyroscopic turn-indicator for aircraft being a typical example. This type of apparatus consists of a gyroscope which is mounted on the craft in such manner that its rotor axis is normally in the plane of the angular velocity to be indicated and the gyroscope is constrained relatively to the craft so that the rotor axis is forced to partake of this angular velocity but is capable of a limited angular displacement relatively to the craft in a plane perpendicular to the plane of the said angular velocity, such displacement being constrained by springs. The displacement of the gyroscope against these springs is approximately proportional to the angular velocity provided the springs are stiff and the displacement small.

The present invention consists of improvements in the method of applying the constraint and more especially in means for applying torques to the gyroscope whereby the gyroscope maintains practically a constant bearing relatively to the moving craft and in utilizing the constraining torques to measure or indicate the angular velocity or the angular displacement of the craft or both or a combination of the two for the purpose of controlling the motion of the craft or the motion of the mechanism mounted upon the same.

Figs. 4, 5 and 6 illustrate an instrument embodying my invention capable of measuring angular velocity in two planes at right angles, say the yaw and roll of an aircraft.

Figure 1:
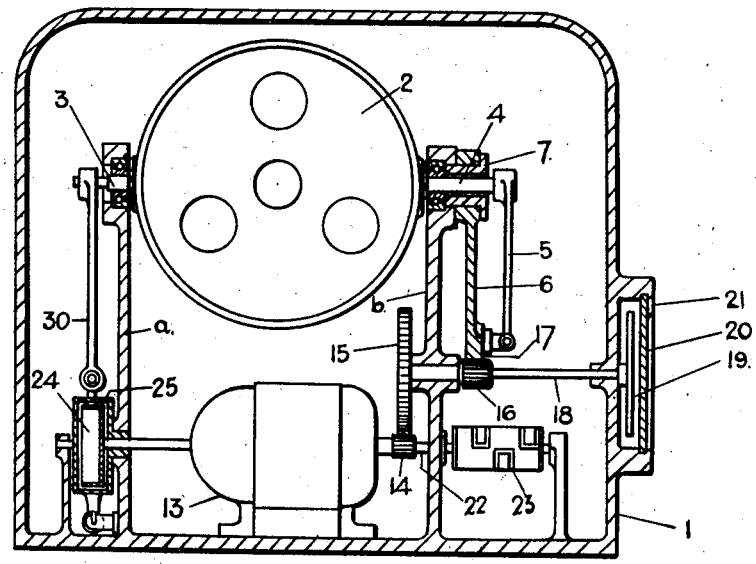
Figs. 1, 2 and 3 illustrate one method of applying the invention to a gyroscopic instrument suitable for a turn indicator for aircraft.
Figure 2:
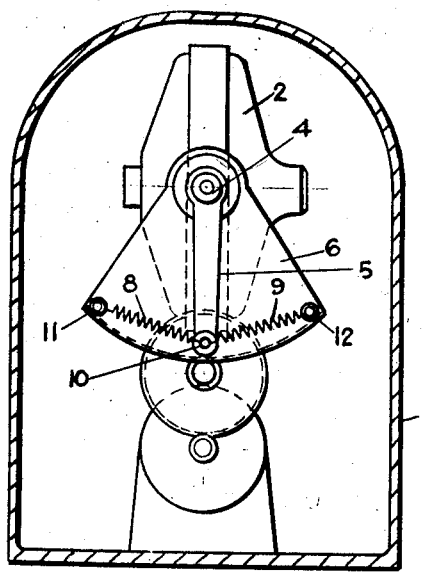
Figure 3:
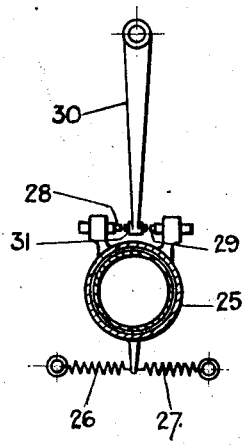

In Fig. 1 the case 1 contains a gyroscope in its casing 2 supported on trunnions 3 and 4 on brackets $a$ and $b$ attached to the case 1. The trunnion 4 carries a crank 5 rigidly keyed to it. The sector 6 is pivoted on a cylindrical boss 7 projecting from the bracket $b$ coaxial with the trunnion 4. Two springs 8 and 9 (Fig. 2) connect the sector 6 to the crank 5 one end of each spring being connected to a pin 10 on the crank 5 and the other ends to two pins 11 and 12 on the sector 6. The sector can be oscillated about the trunnion 7 by the motor 13 through the pinion 14, toothed wheel 15, pinion 16 and toothed sector 17 which is part of the sector 6. The shaft 18 of the pinion 16 and wheel 15 is extended through the case 1 and carries a dial 19 visible through the window 20, a fixed pointer 21 serving to indicate the reading of the dial. The shaft 22 of the motor 13 is fitted at one end with a step-by-step transmitter 23 and at the other end with a disc 24. A cylindrical housing 25 surrounds this disc with a small clearance space all round except at the axle. This space is filled with viscous fluid. The housing 25 is controlled relatively to the case 1 by two springs 26 and 27 as shown in Fig. 3 and carries also two electrical contacts 28 and 29 between which a contact 31 can oscillate which is carried by a crank 30 attached to the trunnion 3. These contacts are electrically connected to the motor 13 so that when 31 touches 28 the motor starts in one direction and when 31 touches 29 the motor starts in the opposite direction. The directions of rotation of the motor are arranged so that the motor by tightening one spring 8 or 9 and slackening the other pulls the crank 5 in the direction which will break the contact energizing the motor. The viscous forces on the brake drum 25 caused by rotation of the disc 24 are also in the direction to break the contact by straining the springs 26 or 27, so that contact is broken earlier than would be the case if the drum 25 were fixed. These viscous forces stop the hunting of the motor which would otherwise take place.

If the case 1 is bolted to the deck of an aeroplane with the trunnion axis 3—4 and the rotor axis both parallel to the deck, the instrument will serve as a turn indicator. As arranged in Fig. 1 the trunnion axis is most conveniently placed fore and aft so that the dial 19 may be in front of the pilot.

When the plane yaws the gyro precesses about the axis 3—4 making contact between 31 and 28 or 29. The motor 13 starts immediately and applies a torque to the trunnion 4 sufficient to break the contact. This torque must be proportional to the angular velocity of yaw and is indicated on the dial 19. The torque can be transmitted by the transmitter 23 to any convenient steering centre.

Fig. 4 shows an arrangement in which one gyro measures two angular velocities in planes at right angles, say the planes of yaw and of roll of an aeroplane.

The casing 1 contains the gyro 2 mounted on vertical trunnions 35 and 36 in a gimbal ring 37 which is supported on trunnions 3 and 4 on brackets $a$ and $b$ attached to the case 1. The trunnion 4 carries the crank 5 and the connection through springs between this crank and the motor 13 is identical with that described in Fig. 1. The trunnion 3 carries a crank 30' with which is incorporated the contact 31' (Fig. 6) making contact with one or other of the contacts 28' or 29' which differ from the corresponding contacts of Fig. 1 in that they are fixed to the case 1 and not mounted on the viscous element. The drum 25' of the viscous brake is driven by the motor 13 through pinions 38 and 39 to get a reversal of direction, and the brake disc 24' is connected by a crank 40 and a cantilever spring 41 to the crank 30'. The viscous forces on the brake disc 24' assist in breaking the motor contacts because they are transmitted to the crank 30' and therefore assist the forces applied to the crank 5.

The gyro case 2 also carries a second set of gimbals consisting of a horizontal ring 45 supported on trunnions 46 and 47 on the case 2 and a vertical ring or half-ring 48 (Fig. 5) supported on the case 1 by trunnions 49 and 50 and connected to the ring 45 by the trunnion 51.

The trunnion 49 carries a crank 55 which is connected by springs to a sector 56 pivoted on a trunnion 76 on the case 1, and the sector 56 is driven by a motor 53 through gearing 54, 57, 58 in a manner somewhat similar to that shown in Fig. 1 and described above. The viscous brake drum 59 is driven by gearing 60 from the motor 53 and the brake disc 61 is connected through a crank 62 and cantilever spring 63 to the tail end of the crank 55.

The pin 64 (Fig. 5) attached to the gyro case 2 carries a contact 65 which oscillates between two contacts 66 and 67 fixed to a bracket 68 bolted to the case 1.

The contacts 65, 66 and 67 energize the motor 13 and the contacts 28', 29' and 31' the motor 53. The motion of the motor 53 can be transmitted by the transmitter 52 and is indicated by the pointer 69 on the dial 62 which is turned by the bevel pinions 60$a$ and 61$a$.

Assume that the frame 1 is at rest and all contacts broken so that the motors 13 and 53 are at rest. Now suppose the case 1 to move about a vertical axis, i. e. to yaw, then the contact 65 comes against either contact 66 or 67. The motor 13 is thereby started and applies a torque to the trunnion 4 which is transmitted through the gimbal ring 37 to the gyro case so that the gyro follows the motion of the case 1 and the contact is broken.

On the other hand if the case 1 rolls about the axis 3—4 contact is made between 31' and 28' or 29' and the motor 53 is started applying a torque to the gyro about the trunnions 49—50 which is conveyed to the gyro case through the gimbal rings 48 and 45 and the gyro is forced to precess so as to follow the case 1.

Figure 7:
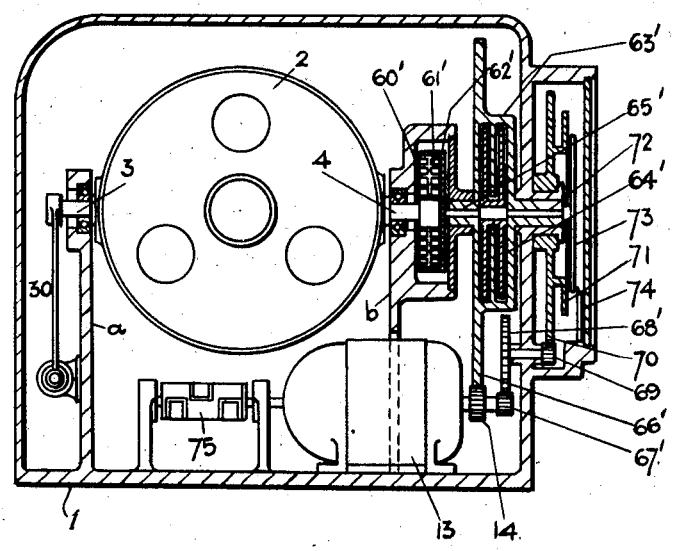
Fig. 7 shows an instrument embodying my invention which indicates the angular velocity, the angular displacement and the sum of the two and is particularly suitable as a steering indicator or for the automatic control of the steering of ships or aircraft.

Fig. 7 is an arrangement which I prefer for use as a steering indicator or as a controller for the automatic control of steering. The gyro case 2 is supported on trunnions 3 and 4 on brackets $a$ and $b$ in casing 1, as in Fig. 1. Torques are transmitted to trunnion 4 through two clock-springs 60' and 61' in the box 62' which is connected through the shaft 65' with the brake discs 64' contained in the brake drum 63', which is driven by the motor 13 through the pinion 14 and toothed wheel 66'. The motor 13 drives through spur gearing 67'—68' and 69—70 a dial 71 and the brake discs 64' drive through a shaft 72 a dial 73. A pointer 74 indicates on both dials. The trunnion 3 carries a crank 30 making contact with one or other of two contacts 28 and 29 fixed to the case 1 as in Fig. 6, these contacts controlling the motor 13.

When the motor 13 is started it drives the brake drum 63' and increases its speed, simultaneously straining the springs 60' and 61' through the viscous forces conveyed from the brake discs 64' to the box 62' until the viscous force thus transmitted to the trunnion 4 is sufficient to break the contact. The spring torque which measures the angular velocity of yaw, is indicated by the spring deflection on the dial 73 by the pointer 74 and the displacement of the motor spindle not only contains the displacement of the brake discs 64' due to the spring deflection but also the displacement of the brake drum 63' relatively to the brake discs 64' which is proportional to the time integral of the viscous forces, that is to say, proportional to the angle of yaw. Hence the displacement of the dial 71 has two components, one proportional to the velocity of yaw and the other proportional to the angle of yaw. The dial 71 thus forms a good steering indicator as the steersman can displace his tiller to follow the motion of this dial by a follow-the-pointer mechanism, thereby applying "displacement" helm and "check" helm as is done by an experienced quartermaster.

The motion of the motor 13 may be transmitted by a transmitter 75 to a servomotor for the automatic control of the tiller or to a follow-the-pointer receiver of usual type.

I claim:—

1. Gyroscopic apparatus for use on an angularly displaceable platform comprising a gyroscope having a normally horizontal spinning axis, a pivotal mounting for said gyroscope movable with the platform to apply a torque about another axis intersecting the first named axis, a constraining connection for said gyroscope, and actuating means for said connection responsive to the precession of said gyroscope to maintain the latter in a substantially constant position relatively to the platform.

2. Gyroscopic apparatus for use on an angularly displaceable platform comprising a gyroscope having a normally horizontal spinning axis, a pivotal mounting for said gyroscope movable with the platform to apply a torque about another axis intersecting the first named axis, force-applying means controlled by said gyroscope and elastic constraining connections between said means and gyroscope operable to maintain the latter in a substantially constant position relatively to the platform.

3. Gyroscopic apparatus for use on an angularly displaceable platform comprising a gyroscope having a normally horizontal spinning axis, a pivotal mounting for said gyroscope movable with the platform to apply a torque about another axis of the gyroscope to precess the latter, an electric switch controlled by the gyroscope, an electric motor controlled by said switch, and constraining connections responsive to said motor and connection to said gyroscope operable to maintain the same in a substantially constant position relatively to the platform.

4. Gyroscopic apparatus for use on an angularly displaceable platform comprising a gyroscope having a normally horizontal spinning axis, a pivotal mounting for said gyroscope movable with the platform to apply a torque about another axis of the gyroscope to precess the latter, an electrical switch, an electrical power device controlled thereby, said switch having co-acting contacts in part operated by said gyroscope, a resistant connection between said motor and other of said contacts, and constraining connections between said motor and gyroscope responsive to the former, said motor and connections operating to restrain the movement of the gyroscope relatively to the platform within limits sufficient only to effect the make and break of said switch contacts.

5. Gyroscopic apparatus for use on an angularly displaceable platform comprising a gyroscope having a normally horizontal spinning axis, a pivotal mounting for said gyroscope movable with the platform to apply a torque about another axis of the gyroscope to precess the latter relatively to the platform, a reversible electric switch controlled by the gyroscope, a reversible electric motor controlled by said switch, constraining connections from said motor to said gyroscope, a viscous device, constraining means connected thereto, said viscous device being driven by said motor and acting on one part of said switch through the second named constraining means to advance the reversal of said switch by an amount proportional to the speed of the motor to prevent hunting of said motor.

6. Gyroscopic apparatus for use on an angularly displaceable platform comprising a gyroscope having a normal horizontal spinning axis, a pivotal mounting therefor movable with the platform to apply a torque about another axis of the gyroscope, force-applying means controlled by said gyroscope, constraining connections responsive to said force-applying means operable to act on said gyroscope and maintain it in a substantially constant position relatively to the platform, and an indicator of the constraining forces.

7. Gyroscopic apparatus for use on an oscillating platform, comprising a gyroscope, a pivotal mounting therefor allowing the gyroscope no freedom of movement relatively to the platform about the axis of angular movement of the platform that is perpendicular to both the platform and to the pivotal axis of said gyroscope said mounting allowing said gyroscope a limited amount of freedom about the trunnion axis at right angles to first said axis, and means responsive to movement of said gyroscope in a direction permitted by its said limited freedom to apply torques to the gyroscope about said trunnion axis to cause the gyroscope to maintain a substantially fixed position in relation to the platform.

8. Gyroscopic apparatus for use on an angularly displaceable platform comprising a gyroscope having a normally horizontal spinning axis, a pivotal mounting therefor movable with the platform to apply a torque about another axis of the gyroscope, force-applying means controlled by said gyroscope, a device affected by time in operating connected with said means, constraining connections from said force-applying means to the gyroscope operable in response to said means to develop constraining forces, and mechanism operable in conjunction with said device and constraining connections to integrate the constraining forces with respect to time.

9. Gyroscopic apparatus for use on an angularly displaceable platform comprising a gyroscope having a normally horizontal spinning axis, a pivotal mounting therefor movable with the platform to apply a torque about another axis of the gyroscope, force-applying means controlled by said gyroscope, constraining means responsive to said force-applying means operable to act on said gyroscope and maintain it in a substantially constant position relatively to the platform and including a member operable in conjunction with said constraining means and to have a displacement comprising two components, one varying with the force of the constraining means and the other with the time integral of the constraining force.

10. Gyroscopic apparatus for use on an oscillating platform, comprising a gyroscope, a pivotal mounting therefor having a trunnion axis maintained in fixed relation to the platform and supporting said gyroscope with its spinning axis normally horizontal, a member movable relatively to the platform and connected to the gyroscope by means including springs for applying to the gyroscope torques about said trunnion axis, and means operated by relative movement between the gyroscope and platform for moving said member to apply torques about said axis.

11. Gyroscopic apparatus for use on an angularly moving platform to measure the angular velocity thereof about an axis fixed relatively thereto, comprising a gyroscope having a rotor axis, a frame rigidly attached to the platform and pivotally supporting said gyroscope on a trunnion axis at right angles to said rotor axis, both said rotor and trunnion axes being inclined to said relatively fixed axis, and means responsive to movement of the gyroscope about said trunnion axis produced by movement of the platform around said relatively fixed axis to apply torques about the trunnion axis and in the opposite direction to said movement of the gyroscope to cause the rotor axis to maintain a substantially fixed position in relation to the platform.

12. Gyroscopic apparatus for use on an angularly moving platform for measuring the angular velocity of the platform about an axis fixed relatively to the platform, comprising a gyroscope having its rotor axis at right angles to said axis and having freedom relatively to the platform about a trunnion axis at right angles to both said axes, means restricting said freedom to a small angular movement of the rotor axis to either side of a central or normal position, torque-applying means acting about said trunnion axis and actuating means operated by contact between the gyroscope and said restricting means for causing said torque-applying means to apply torques to the gyroscope to break said contact.

13. Gyroscopic apparatus for measuring the angular velocity of an angularly moving body comprising a gyroscope, a mounting therefor pivotally supporting said gyroscope on an axis in neutral equilibrium and with a degree of freedom thereabout and with the spinning axis of the gyroscope normally horizontal and substantially perpendicular to the first named axis, said mounting maintaining said first named axis fixed with respect to the body, external means having force-applying media acting oppositely on said gyroscope, said gyroscope having a normal position fixed relatively to the body which it tends to leave when affected by the angular velocity of the body, said external means being actuated from said gyroscope in consequence of said tendency, and indicating means responsive thereto to indicate the angular velocity of the body, said external means applying torques to the gyroscope to cause it to retain said normal position relatively to the body.

14. Gyroscopic apparatus for measuring the angular velocity of an angularly moving body comprising a gyroscope, a mounting therefor pivotally supporting said gyroscope on an axis in neutral equilibrium with a degree of freedom thereabout and with the spinning axis of the gyroscope normally horizontal and substantially perpendicular to the first named axis, said mounting maintaining said first named axis fixed with respect to the body, external means having force-applying media acting oppositely on said gyroscope, said gyroscope having a normal position fixed relatively to the body which it tends to leave when affected by the angular velocity of the body, switch elements operable by departure of said gyroscope from its normal position, said external torque-producing means being controlled by said switch elements and indicating means responsive to said torque-applying means to indicate the angular velocity of the body, said torque-applying means being operable to apply torque to the gyroscope to cause it to retain said normal position relatively to the body.

15. Gyroscopic apparatus for measuring the angular velocity of an angularly moving body comprising a gyroscope, a mounting therefor pivotally supporting said gyroscope about an axis in neutral equilibrium with a degree of freedom thereabout and with the spinning axis of the gyroscope normally horizontal and substantially perpendicular to the first named axis, said mounting maintaining said first named axis fixed with respect to the body, external means having force-applying media acting oppositely on said gyroscope, said gyroscope having a normal position fixed relatively to the body which it tends to leave when affected by the angular velocity of the body, indicating means responsive to said force-applying media to indicate the angular velocity of the body, elements limiting displacement of the gyroscope from its normal position, and means comprehending said force-applying means responsive to the limitation of the displacement of said gyroscope by said elements applying torque to said gyroscope to substantially prevent the same from tilting from its normal position.

16. Gyroscopic apparatus for measuring the angular velocity of an angularly moving body comprising a gyroscope, a mounting therefor pivotally supporting said gyroscope on an axis in neutral equilibrium with a degree of freedom thereabout and with the spinning axis of the gyroscope normally horizontal and substantially perpendicular to the first named axis, said mounting maintaining said first named axis fixed with respect to the body, external torque-producing means adapted to center said gyroscope when it is not under precessional influences, said gyroscope having a normal position fixed relatively to the body which it tends to leave when affected by the angular velocity of the body, switch elements having normal positions and movement relatively thereto, resistive yielding means and a viscous brake, said relative movement of said switch elements being controlled partly by said yielding means and partly by said viscous brake, and indicating means responsive to said torque-producing means to indicate the angular velocity of the body, said torque-producing means applying torques to the gyroscope to cause it to retain its normal position relative to the body.

17. Gyroscopic apparatus for use on an angularly displaceable platform comprising a gyroscope, a mounting therefor having a rigid connection to the platform and pivotally supporting said gyroscope on an axis in neutral equilibrium with a degree of freedom thereabout and with the spinning axis of the gyroscope normally horizontal and substantially perpendicular to the first named axis, said mounting maintaining said first named axis fixed with respect to the platform, said mounting and said gyroscope being angularly movable about another axis that is perpendicular to the platform and passes through the intersection of the first named and said spinning axes, force-applying means controlled by said gyroscope when the latter turns about said axis that is perpendicular to the platform, constraining connections from said force-applying means to said gyroscope, and means for indicating the constraining forces.

18. Gyroscopic apparatus for measuring the angular velocity of an angularly moving platform about an axis fixed relatively to the platform, comprising a gyroscope, a frame connected to the platform so as to partake of said angular velocity, means to pivot the gyroscope on said frame on trunnions at right angles to the rotor axis of said gyroscope so that said rotor and trunnion axes are both at right angles to said relatively fixed axis, a member movable relatively to the platform in either of two directions, power means for moving said member, said power means being actuated in one direction or the other by relative displacements between the gyroscope and platform caused by angular movements of the platform about said relatively fixed axis, and torque-applying means acting on the gyroscope and actuated by said member for applying torques to the gyroscope about said trunnion axis in the direction to cause the gyroscope to precess so as to annul said displacement.

19. Gyroscopic apparatus for measuring the component angular velocity of an angularly moving platform about an axis fixed relatively to the platform, comprising a gyroscope having a rotor and trunnion axis at right angles to each other, a pivotal support therefor partaking of said angular velocity of the platform and arranged so that said rotor and trunnion axes are normally at right angles to said relatively fixed axis, a member movable relatively to the platform, torque-applying means actuated by movements of said member for applying torques to the gyroscope in a plane containing said rotor axis and said relatively fixed axis in one direction or the other according to the direction of movement of the member, and means controlled by relative movements between the gyroscope and the platform produced by said component angular velocity of the platform for moving the member so as to apply torques to the gyroscope to cause it to maintain its rotor axis in a substantially fixed position relatively to the platform irrespective of said angular velocity of the platform.

20. Gyroscopic apparatus for use on an angularly moving platform for measuring the angular velocity of the platform about an axis fixed relatively to the platform, comprising a gyroscope, a support therefor carried by the platform and partaking of said angular velocity of the platform, said support and gyroscope being so arranged that angular movement of the platform about said relatively fixed axis produces an angular displacement between the gyroscope and support, power means controlled by said angular displacement of the gyroscope, and torque-applying means acting on the gyroscope and actuated through said power means by said angular displacement of the gyroscope to apply torques to the gyroscope so as to cause it to precess about said relatively fixed axis with a velocity equal to the said component angular velocity of the platform and in the same direction.

21. Gyroscopic apparatus for measuring the component angular velocity of an oscillating platform about an axis fixed relatively to the platform, comprising a gyroscope pivotally mounted in a support with only sufficient freedom of movement to actuate a reversible relay, means to connect the support to the platform so that angular movement of the platform about said relatively fixed axis causes the gyroscope to actuate said relay, and torque-applying means controlled by said relay for applying torques to the gyroscope to cause it to precess so as to de-energize said relay and to maintain a fixed position relatively to the platform irrespective of the angular movement of the platform round said relatively fixed axis.

JAMES BLACKLOCK HENDERSON.